April 8, 1941.   L. W. BENOIT   2,237,776
GATE VALVE
Filed May 12, 1938   2 Sheets-Sheet 1
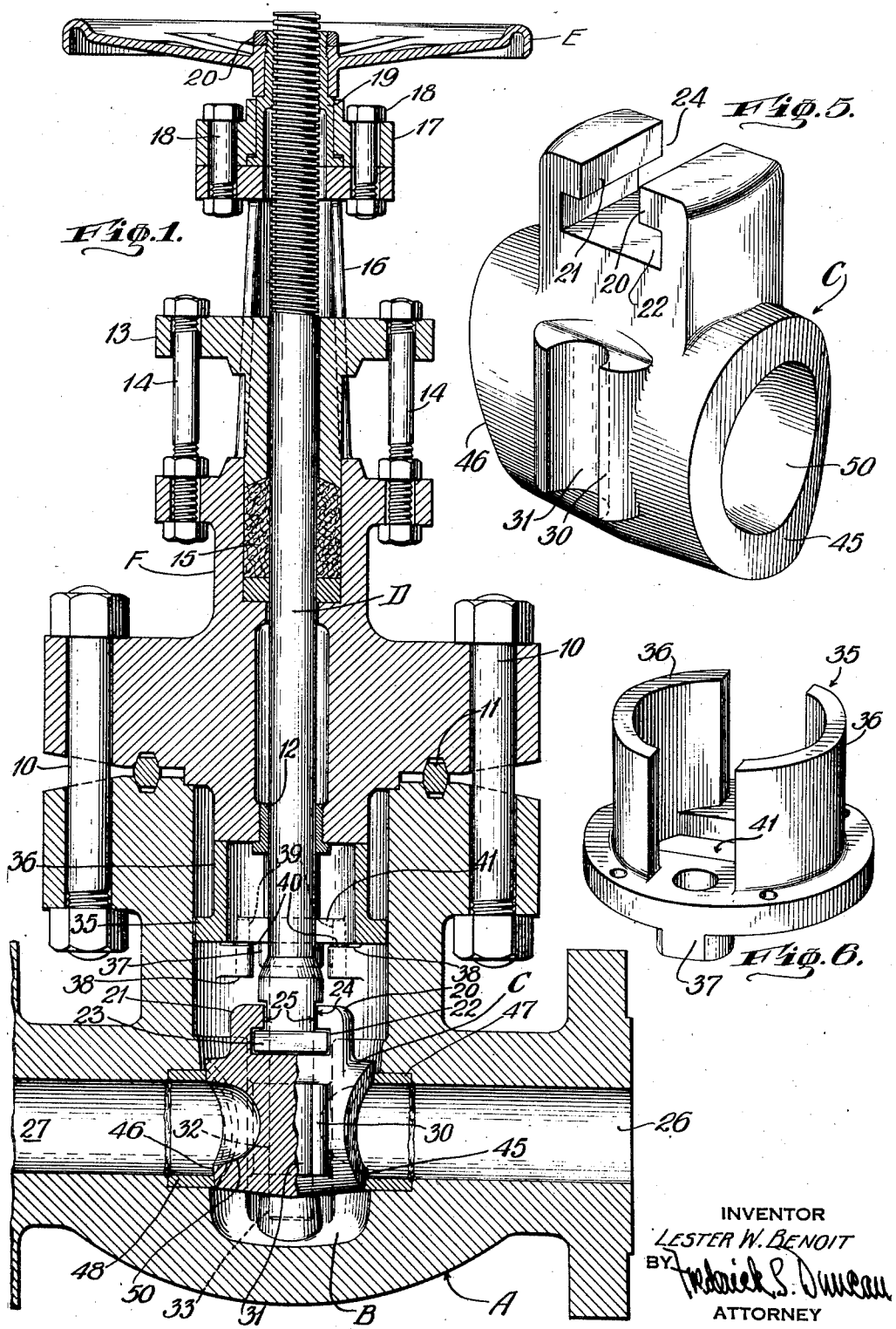
INVENTOR
LESTER W. BENOIT
BY
ATTORNEY April 8, 1941. L. W. BENOIT 2,237,776
GATE VALVE
Filed May 12, 1938 2 Sheets-Sheet 2
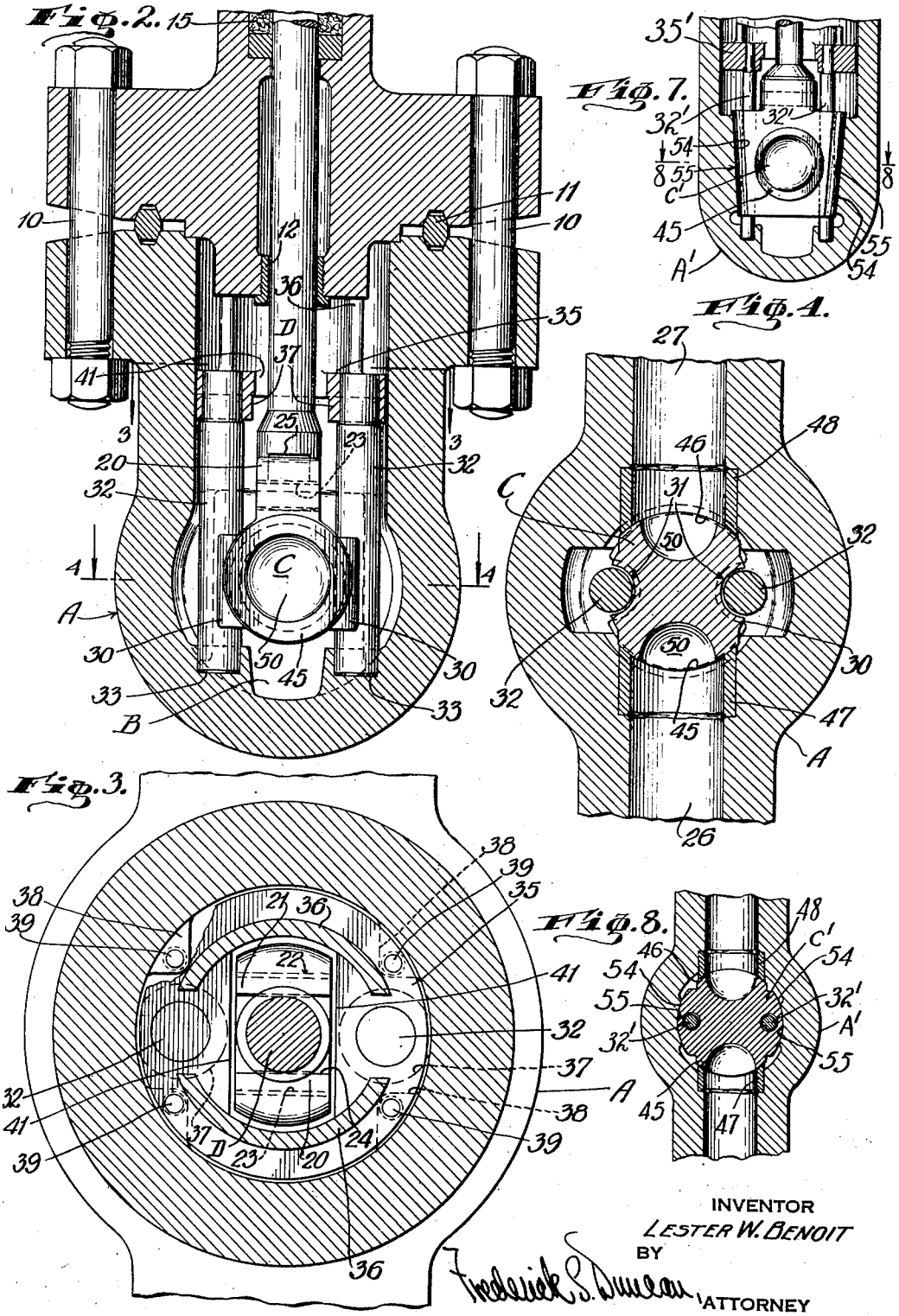
INVENTOR
LESTER W. BENOIT
BY
Frederick S. Duncan
ATTORNEY Patented Apr. 8, 1941

2,237,776

UNITED STATES PATENT OFFICE 2,237,776

GATE VALVE

Lester W. Benoit, Shillington, Pa., assignor to American Chain & Cable Company, Inc., New York, N. Y., a corporation of New York Application May 12, 1938, Serial No. 207,482

2 Claims. (Cl. 251—59)

This invention relates to an improved construction of valves of the gate valve type for use with fluids under high pressures and temperatures.

In the conventional type of wedge-shaped gate valve in which the seat ring center lines extend at an angle to the port center lines, the angular faces or seats for the seat rings and the angular valve seat faces on the seat rings cannot be machined during the same setting of the valve body. Special angle plates are required and the valve body must be shifted to produce opposite sides of the valve mechanism thus making it difficult to obtain and hold a perfect angular relation between the valve seat faces of the rings. To make a proper seating valve of this design, the vertical center lines of the valve seat faces of the seat rings and the valve faces of the valve must be made to lie in a common plane and the corresponding transverse lines on the valve seat faces of the seat rings and the valve faces of the valve must be parallel and lie in the same common plane otherwise the planes of the wedge-shaped valve and the seat rings will not truly match. Certain of these difficulties, such as obtaining absolute parallelism between the valve seat faces of the seat rings and the valve faces of the component parts of the parallel type of gate valve are also experienced in the construction of the conventional type of parallel gate valve. For this reason various devices have ben resorted to such as tiltable mountings for the seat rings and linkage connections between the several parts of composite valves to permit these parts to seat properly. Also spring devices have been used to urge component parts of composite valves against their seats, and ring seals between the valve and valve seats have also been employed.

It is an object of my invention to eliminate the difficulties hereinbefore set forth by the use of a conical gate valve, cooperating with conical valve seat faces on seat rings, the center lines of which coincide with the center lines of the ports on opposite sides of the valve and which center lines of the ports coincide with each other.

It is also an object of my invention to provide means for positively guiding the valve in its movements into its closed and open positions. To this end I provide relatively short guide rods positively held at one end in the valve body and at their other end by means which is located within and non-rotatable with respect to the valve body.

It is a further object of my invention to so locate the valve guide rods as not to interfere with the flow of fluid through the valve compartment in the valve body and to provide means on the valve interengaging said guide rods located inside of the conical surface of the valve whereby the valve may be ground to a close fit on the seats of the seat rings.

Other objects of the invention will appear from the following description taken in connection with the drawings, in which:

Fig. 1 is a vertical longitudinal section through a valve body showing my improvements;

Fig. 2 is a transverse section through the valve body showing the valve in end view;

Fig. 3 is a horizontal section on an enlarged scale taken on the line 3—3 of Fig. 2;

Fig. 4 is a horizontal section taken on the line 4—4 of Fig. 2;

Fig. 5 is an enlarged perspective view of the valve;

Fig. 6 is an enlarged perspective view of the guide rod supporting spider;

Fig. 7 is a transverse section corresponding to that shown in Fig. 2 of a modified construction; and Fig. 8 is a horizontal section taken on the line 8—8 of Fig. 7.

In the drawings the reference character A designates a valve body provided with a valve compartment B in which is housed a valve C to which is connected a stem D operated by a hand wheel E, the stem D being supported and guided by a bonnet F which is flanged and secured to the valve body by bolts 10 in the usual manner, a sealing ring 11 being provided to effect a tight seal between the bonnet and the valve body. The valve stem may be guided in the bonnet by a screw threaded sleeve 12 and by a flanged gland 13 connected adjustably by bolts 14 to the flange on the bonnet F by means of which pressure on the packing ring 15 is applied to cause a tight seal between the valve stem and the bonnet. The bonnet is provided with the usual yoke 16 to which is secured a retaining cap 17 by bolts 18 to retain the yoke bushing 19 in position on the yoke, the bushing being rotated by the hand wheel E which is threaded thereon and locked in position by a lock nut 20. The interior of the yoke bushing is threaded to raise and lower the valve stem D upon rotation of the hand wheel. All these features so far described in detail are old and well-known.

The valve C is provided at its upper end with opposed inwardly directed overhanging shoulders 20 and 21 defining a substantially rectangular opening 22 below the shoulders to receive the rectangular head 23 of the stem, and defining also a rectangular opening 24 to receive a reduced flat sided portion 25 of the valve stem whereby the stem of the valve will be held against rotation when the hand wheel is operated to raise or lower the stem.

For the purpose of preventing rotation of the valve C, each side of the valve is provided with a projection 30 which is provided with a semi-cylindrical groove 31 to slidably receive a guide rod 32 seated at its lower end in a depression 33 in the valve body, and its upper end in an aperture in a spider 35 which is in the form of a disk and is provided with flanges 36 which abut against the lower end of the bonnet to limit the movement of the spider in one direction. The flanges 36 are parts of a cylinder interrupted at diametrically opposite points in line with the apertures and apertured lugs 37 in the disk. The spider is supported on four radial lugs 38 formed on the body of the valve and is held against rotation by pins 39 which are seated in holes in the spider and lugs and which are provided with annular flanges 40 by which they are held in place. The spider is provided with an opening 41 to provide for clearance for the head of the stem which is preferably of the transverse shape indicated in Fig. 3. By means of this construction the valve and valve stem are held against rotation as the valve is moved from one position to another.

The valve C is provided with valve faces 45 and 46 which are parts of the same cone, these faces being defined by the projection of an annulus which lies normal to the center lines of the ports 26 and 27. The width of the valve faces is no greater than necessary in order that they may be properly hardened and ground and fitted to the valve seat faces on the seat rings 47 and 48. For this purpose the valve is provided with depressions 50 inside of the valve faces 45 and 46.

The valve seat rings 47 and 48 are supported in the valve body with their center lines in line and coinciding with the center lines of the ports 26 and 27, and engage right angular shoulders formed by drilling said valve body. The seat rings may be threaded or expanded, or welded in position on said shoulders. The seat rings are provided with conical valve seat faces to mate with the conical valve faces on the valve C. The center line of the valve faces on the valve C lies slightly above the center line of the valve seat faces on the seat rings 47 and 48 whereby when the valve becomes worn in use the valve seat rings may be ground to fit.

In the construction disclosed the seat ring center lines coincide with the port center lines and the abutting faces on the ring and body are normal to the port center lines. This feature makes it possible to machine the body to receive the seat rings without the use of any angle seating fixtures and also permits inserting and securing the seat rings by any of the following methods—pressing in, threading or expanding.

The seat ring valve seat faces lie on a conical arc. The construction is of such design that the ring can be hard surfaced and completely finished with the exception of a final polish before being placed in position. The finishing of the opposed valve seat faces of the seat rings is done at the same time at a single setting, thus eliminating any difficulties due to disturbing the setting of the body. The corresponding vertical and horizontal lines of the valve seat faces of the seat rings are readily machined and finished to lie in or symmetrical to common planes. Likewise the vertical and horizontal lines of the valve faces on the valve are readily machined and finished to lie in planes which coincide with the corresponding planes through the valve seat faces of the seat rings. The problems connected with the manufacture of wedge-faced valves and seats are not present in the manufacture of the conical plug or wedge which can be produced by rotating it on its centers.

The advantages of the tapered conical seating surfaces are obvious. As the wedge nears the seat the surfaces, being conical, draw the two mating parts to their common cone center. In the conventional type valve there is no means for drawing the mating parts to a common center line or means for keeping the relative center lines from becoming twisted in relation to each other thus allowing the wedge to seat at an angle with the seat rings.

It should be noted that the seating surfaces on the plug are its maximum diameter and the guide grooves are inside this diameter allowing the plug to be rotated and the tools employed will meet no obstructions while working. The guide bars are inside of this diameter and are clear of the thru port and will not obstruct the flow.

The means for guiding the plug to its seat and preventing it from rotation due to stem torque is different from certain conventional type valves in that two relatively short removable bars are used, which can be produced independently from the body and can be hardened and ground and can also be made of any desirable material such as rustless steel or a hard surface material.

Furthermore, with guides removable there is no obstruction in the body when machining the seats. This guiding method allows both the bars and the grooves in the wedge to be ground to much closer allowances and tolerances than can be obtained in conventional design and enables the wedge or plug to be guided to a point much closer to the actual contacting of the seating surfaces than ever before. These close limits are made possible by using the bearing surfaces of the seat rings as a register in producing the location of the bars. That is to say, after the seating surfaces have been produced, a master plug will be inserted in the valve; this plug having guide bushings for the tool that machines the sockets in the body which receive the ends of the bars.

It should be noted that the guide bars are supported at both ends to obtain maximum rigidity. To get the maximum amount of rigidity the bars must be as short as possible. The bars in this case are the shortest possible and this feature is obtained by the use of a basket or spider which is inserted in the bonnet neck nesting on finished lugs which are integral with the body. These lugs are machined at the same time as the seat ring surfaces are produced and locate the spider diametrically as well as vertically. The spider has sockets to support the upper end of the guide bars. Four downwardly projecting pins in the spider fit holes in the body lugs locating the spider radially so that the bar sockets in the spider are on the same center lines as the bar sockets in the body.

The spider has two lugs projecting upward to the under side of the bonnet which determines the amount of axial travel the bars can have. Slight axial movement is allowed to provide for changes due to expansion.

In Figs. 7 and 8, I have shown a modified form of construction in which A' designates the valve body in which is housed the valve C' provided with valve faces 45 and 46 cooperating with seat rings 47 and 48 as in the first modification disclosed. This construction also includes a spider 35' similar to that shown in the first form which supports guide rods 32' which preferably pass through holes in the valve, said guide rods being of smaller diameter than those shown in the first form in order that they may be located closer to the axis of the valve than the valve faces on the valve. The valve is provided on its opposite sides with faces 54 which cooperate with seats 55 on the valve body A'. The faces 54 and the seats 55, and the valve faces 45 and 46 and the valve seats on the valve seat rings 47 and 48, are parts of the frustum of a cone, in order that the faces 54 and valve faces 45 and 46 may be machined, ground and finished at the same time, and also so that the seats 55 and the valve seats on the valve seat rings 47 and 48 may be machined, ground, and finished at the same time.

These additional seating surfaces 54 and 55 arranged at right angles to the common axis or center line of the valve faces and valve seat rings prevent lengthening and warpage of the valve body and spreading of the valve seat rings and assist in maintaining the transverse circular form of the valve seat rings.

While I have described my invention with reference to one embodiment, it is to be understood that this has been done for the purpose of disclosure and is not to be considered limitative, and that I reserve the right to make various changes in the construction and relation of parts falling within the principles of my invention and the scope of the appended claims.

I claim:

1. In a gate valve, a valve body provided with a central valve compartment and with cylindrical ports on each side of said compartment communicating therewith, said ports having a smooth bore throughout the valve body and having coinciding axes, said ports also being enlarged adjacent said compartment to provide annular shoulders lying in planes normal to the common axis of said ports, hollow cylindrical valve seats of a wall thickness equal to the depth of said shoulders fitted in said enlargements against said shoulders whereby said valve seats maintain the smooth bore continuity of the cylindrical ports, said valve seats having hard-surfaced valve seat faces constituting parts of the surface of a cone having its axis normal to the common axis of said ports, and a conical valve cooperating with the valve seat faces of said valve seats.

2. In a gate valve, a valve body provided with a valve compartment communicating with aligned ports, said ports being provided with valve seat rings, a valve, a valve stem, a bonnet secured to said body and through which the valve stem extends, a spider element comprising a disc and spaced upstanding arcuate flanges extending from said disc to abut against said bonnet, said disc portion being provided with an opening through which the valve stem extends, means for securing said disc to said valve body, a plurality of guide rods in said valve body having their opposite ends secured in said disc and valve body respectively, said guide rods cooperating with the said valve to guide the latter in its movements from and to open and closed positions, the means for securing the disc to the valve body being removable and the guide rods being located wholly within the contour of said valve whereby the valve may be rotated after removal of said guide rods to grind the faces of the valve and of the seat rings to provide closely fitting surfaces.

LESTER W. BENOIT.